C. H. JACKSON.
Joint for Solid and Tubular Connections.

No. 213,754.  Patented April 1, 1879

UNITED STATES PATENT OFFICE.

CALEB H. JACKSON, OF HARRISBURG, PENNSYLVANIA.

IMPROVEMENT IN JOINTS FOR SOLID AND TUBULAR CONNECTIONS.

Specification forming part of Letters Patent No. 213,754, dated April 1, 1879; application filed February 19, 1879.

*To all whom it may concern:*

Be it known that I, CALEB H. JACKSON, of Harrisburg, county of Dauphin, State of Pennsylvania, have invented or discovered a new and useful Joint for Solid and Tubular Connections; and I do hereby declare the following to be a full, clear, concise, and exact description thereof, reference being had to the accompanying drawings, making a part of this specification, in which—like letters indicating like parts—

Figure 1:
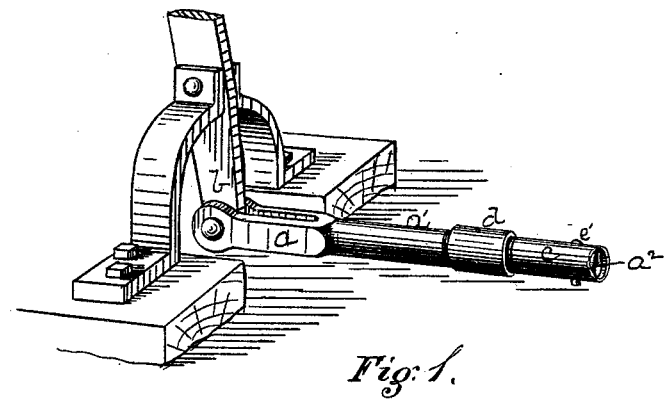
Figure 2:
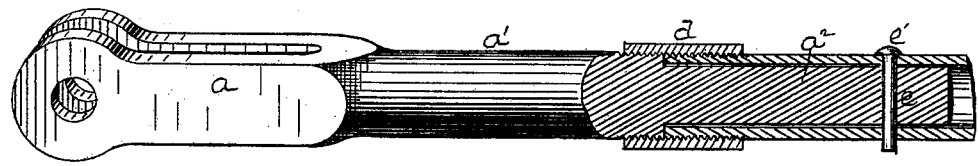

Figure 1 is a perspective view of a portion of a connecting rod or shaft, such as is adapted to communicate motion in a direct line in either direction, and embodying my present improvement; and Fig. 2 is an enlarged view, partly in section, of so much as illustrates the manner of making the joint.

Experience has shown that ordinary gas-pipe or other like tubing is especially adapted for use in making connections between objects or devices more or less distant from each other, where motion is to be communicated from one to the other by a longitudinal thrust or pull.

A jaw, such as is shown at $a$, or an equivalent eye or link, is often, and, in fact, usually, required at one or both ends of the gas-pipe, by means of which a jointed connection may be made with a lever, $b$, bell-crank, or other like or known means for receiving or transmitting motion.

My present invention relates to means of making the connection between the jaw $a$ or other end connection and the gas-pipe, the end of which is represented at $c$. Heretofore such connection or joint has been made usually by welding the end of the gas-pipe onto the cylindrical stem of the jaw; but this is objectionable, because a good weld cannot be made; also because the welding operation reduces the strength of the gas-pipe at the joint, and also because the pipes often have to be cut to length and fitted at a distance from a welding-fire.

In carrying out my invention, I make the jaw $a$ with a cylindrical stem, $a^1$, of about the size of the outer diameter of the gas-pipe $c$, with which it is to be used, and with a cylindrical tang, $a^2$, of the proper diameter to slip readily into the tubular bore of the gas-pipe $c$, and long enough to enter it a few inches—say three or four, more or less. This forging is done at the shop, and a pin-hole, $e$, is made in the tang. Couplings $d$, internally threaded, of the usual construction, are also provided. The lengths being ascertained when the connections are made, the workmen, with such tools and hand-furnace as can be conveniently transported from place to place, can cut the pipe to the proper length, cut the exterior screw-thread thereon, and punch the holes so that they shall come in line with the previously-punched hole in the tang $a^2$, for the inserting of a pin, $e'$. The parts are then readily united by joining the threaded end of the pipe with the threaded end of the stem $a^1$, by the use of the coupling or socket $d$, after which the pin $e'$ is driven tightly into the holes of the pipe and tang.

The tang $a^2$ entering the bore of the gas-pipe, and being secured thereto by the pin, adds materially to the strength and solidity of the joint at what would otherwise be its weakest point, and a better joint is secured than can be effected by the more laborious operation of welding.

I claim herein as my invention—

1. The stem $a^1$ and tang $a^2$, in combination with coupling or socket $d$ and pipe $c$, substantially as set forth.

2. The threaded stem $a^1$ and perforated tang $a^2$, in combination with socket $d$, pipe $c$, and pin $e'$, substantially as set forth.

In testimony whereof I have hereunto set my hand.

CALEB H. JACKSON.

Witnesses:
S. W. FLEMING,
DAVID FLEMING, Jr.